Aug. 15, 1939.   R. W. GRISWOLD, 2D   2,169,416
SLOTTED DEFLECTOR FLAP
Filed June 12, 1936   3 Sheets-Sheet 1

INVENTOR.
Roger W. Griswold II
BY
Harris G. Luther
ATTORNEY

Aug. 15, 1939.  R. W. GRISWOLD, 2D  2,169,416
SLOTTED DEFLECTOR FLAP
Filed June 12, 1936  3 Sheets-Sheet 2
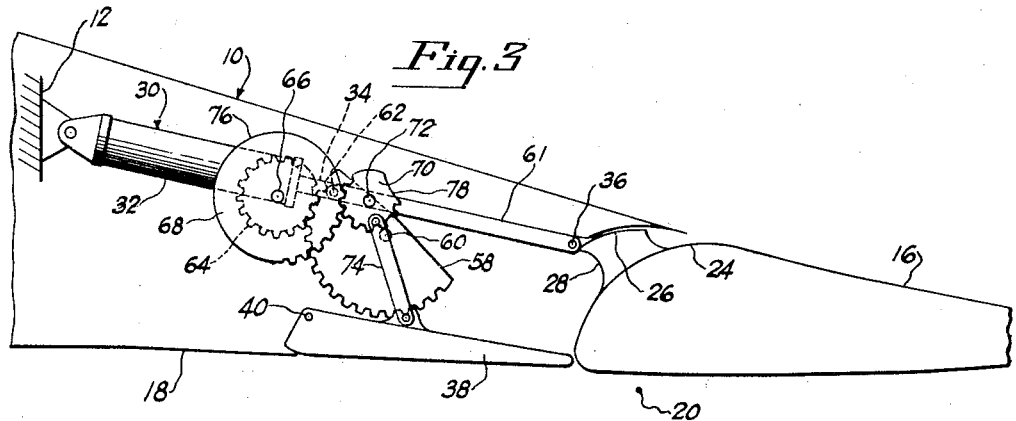
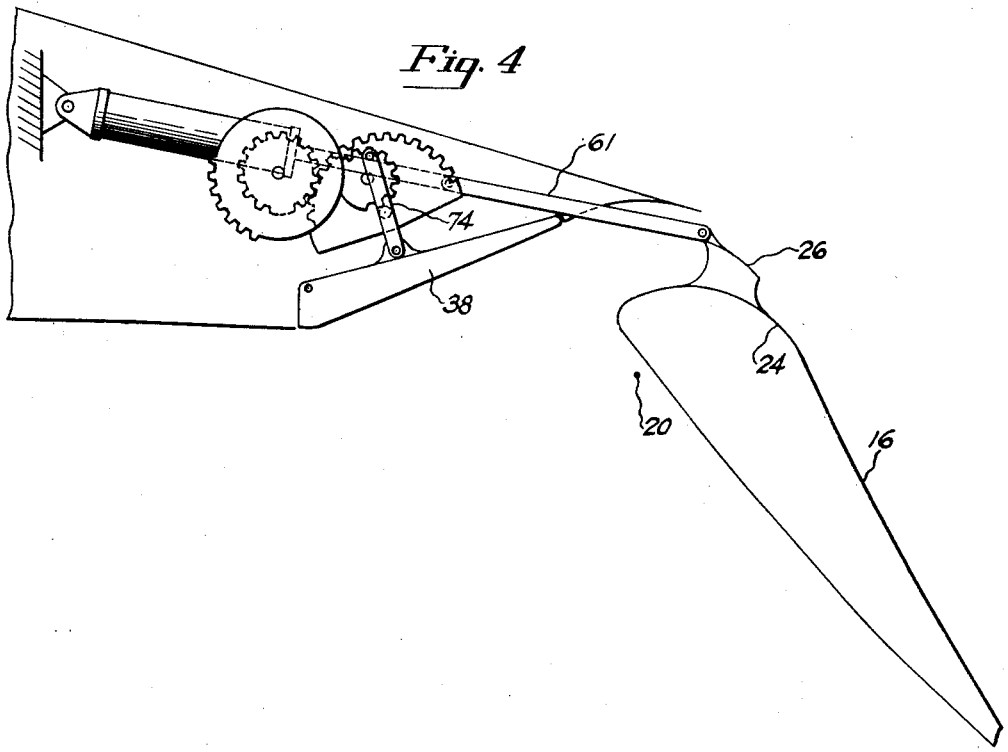
INVENTOR.
Roger W. Griswold II
BY Harris G. Luther
ATTORNEY Aug. 15, 1939. R. W. GRISWOLD, 2D  2,169,416
SLOTTED DEFLECTOR FLAP
Filed June 12, 1936  3 Sheets-Sheet 3

INVENTOR.
Roger W. Griswold II
BY Harris G. Luther
ATTORNEY

Patented Aug. 15, 1939

2,169,416

UNITED STATES PATENT OFFICE 2,169,416

SLOTTED DEFLECTOR FLAP

Roger W. Griswold, 2nd, Old Lyme, Conn., assignor to United Aircraft Corporation, East Hartford, Conn., a corporation of Delaware Application June 12, 1936, Serial No. 84,908

15 Claims. (Cl. 244—40)

This invention relates to lift increasing devices for airplane wings, and has particular reference to a wing construction arranged to provide for an increased lift when the airplane is operating at relatively slow speeds, such as in taking off, climbing, and landing.

Various forms of lift increasing devices are known to the prior art, but none of them, within the knowledge of the present inventor, are free from certain material disadvantages which this invention has been particularly designed to overcome.

One usual form of lift increasing device is known as the Handley-Page slot and comprises a fixed or variable slot extending through the wing from bottom to top adjacent to the leading edge of the wing, or to the leading edge of a wing portion, the lift of which it is desired to increase. While such a slot is effective to increase the ultimate lift of the wing, the lift increasing action of the slot does not become effective at low wing inclinations. The effect of such a slot is more to delay the stalling or burbling angle of the wing so that the wing can be set at a much higher angle of incidence before stalling with the slot than without it. This arrangement does not materially benefit an airplane such as is used in modern commercial service, as such a plane would never be inclined to the angle necessary to obtain the benefit from such a device. In fact, it is in many cases desirable to decrease the angle at which the maximum lift effect of the wing occurs rather than to increase the angle of attack necessary to attain maximum lift. A further disadvantage of the Page slot is that it has the effect of greatly increasing the drag coefficient of the wing at low incidence so that the L/D coefficient of the slotted wing under high speed flight conditions has been found to be undesirable for most practical applications.

Another lift increasing device which has been previously employed is the hinged, or movable, trailing edge flap, which is merely a separate part of the rear portion of the wing hinged to the fixed portion in such a manner that it may be tilted downwardly to change the general contour of the wing airfoil section. These flaps, as evidenced by their frequent commercial application, have material advantages over the slot type lift increasing devices, but are still subject to certain material disadvantages.

Such flaps are of two kinds, ordinary denominated split flaps, and full trailing edge flaps.

In the split flap construction only the lower surface of the rear portion of the wing is movable and in many installations it has been found that this construction produces excessive drag, turbulence, and instability of the airplane due to shifting of the center of lift of the wings equipped with such flaps.

The full trailing edge flap, while constructionally somewhat more difficult than the split flap, has certain advantages that have rendered it preferable in many modern installations. It does not increase the thickness of the trailing edge of the wing, but simply changes the contour of the wing airfoil section to increase the lift characteristics of the wing. One of the chief disadvantages of this type of construction lies in the fact that its use is limited as it has not ordinarily been found practical to deflect the flap over more than a small portion of the range in which it would theoretically be effective to increase the lift of the wing. This condition is principally due to the fact that as the angle of the flap increases, it soon approaches and passes the maximum stalled condition at slow speeds, after which it loses its lift effectiveness entirely and also upsets the airflow conditions over the remaining, or fixed, portions of the wing. This condition has been slightly helped by combining a Handley-Page slot with a full trailing edge wing flap, the purpose of the slot being to delay the stalling or burbling angle of the flap. Even this construction, however, has been found to be deficient as the presence of the slot greatly increases the drag of the wing under ordinary flying conditions, and does not greatly increase the range of effectiveness of the flap, as the air flowing through the ordinary form of slot begins to pull away from the upper surface of the flap at an angle of incidence only slightly greater than that at which burbling occurs without the slot when the total possible effective range of the flap is considered.

The present invention is designed to provide a highly effective lift increasing mechanism operative over a wide range without the disadvantages of increased drag and turbulence outlined above, and without any increase in drag under normal flying conditions. This object is accomplished by providing, in connection with a slotted full trailing edge flap, means, as described below, for rendering the flap fully effective over substantially its entire theoretical range of lift increasing adjustments, and for converting the flapped and slotted wing into the equivalent of a wing of substantially unbroken airfoil contour during normal flying.

In the accompanying drawings in which like reference numerals are used to designate similar parts throughout, there are illustrated, somewhat schematically, three slightly modified forms of what is now considered to be the preferred embodiment of the idea of the invention. The drawings, however, are for the purpose of illustration only and are not to be taken as limiting the invention the scope of which is to be measured entirely by the scope of the appended claims.

In the drawings,

Fig. 1 is a somewhat schematic sectional view of the rear portion of an airplane wing showing a lift increasing device constructed according to one form of the idea of the invention applied thereto, the lift increasing trailing edge flap being shown in its neutral or normal flight position and the remaining elements of the construction in position consistent with the neutral position of the trailing edge flap;

Fig. 3 is a view similar to Fig. 1 showing another modified form of the idea of the invention;

Fig. 4 is a view similar to Fig. 3 showing the trailing edge flap in a lift increasing position and the other elements of the construction in position consistent with the lift increasing position of the trailing edge flap;

Figure 5:
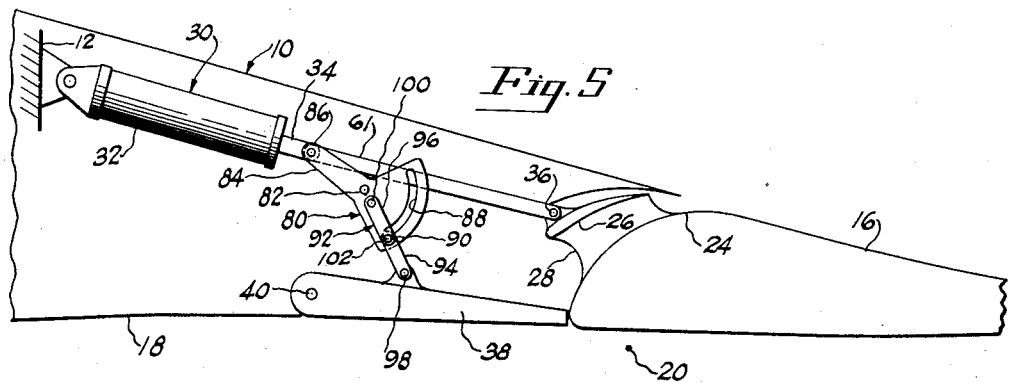
Fig. 5 is a view similar to Fig. 1 showing a third somewhat modified form of the idea of the invention.
Figure 6:
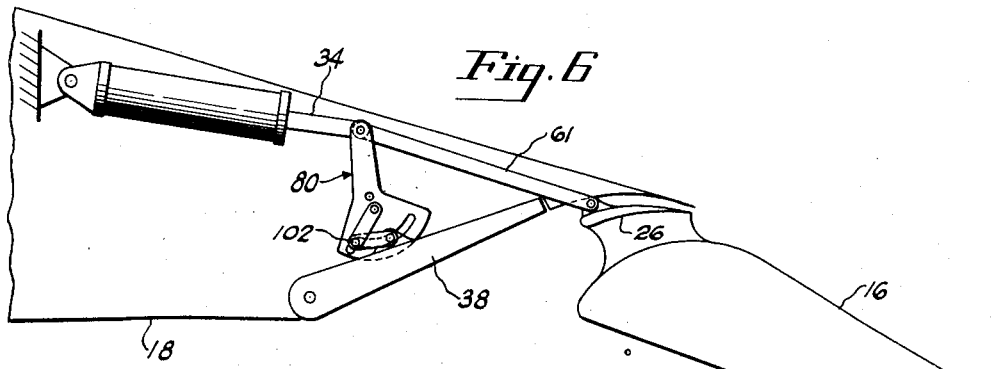
Figure 7:
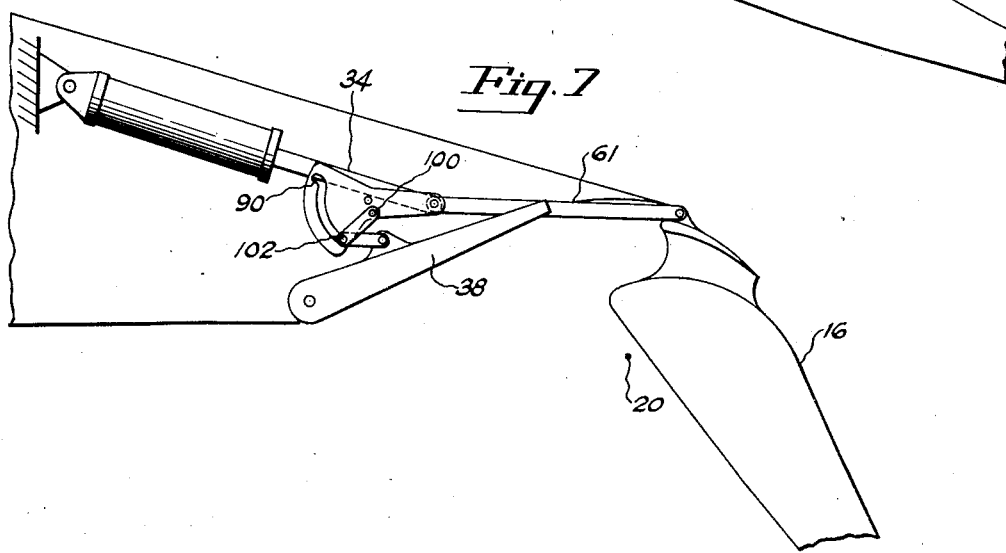

Fig. 6 is a view similar to Fig. 5 showing the trailing edge flap in its half flap or intermediate position, and the remaining elements of the construction in position consistent with such intermediate position of the trailing edge flap; and Fig. 7 is a view of the same construction illustrated in Fig. 5, but showing the trailing edge flap in its full flap or maximum lift increasing position, and the other elements of the construction in position consistent with the full flap position of the trailing edge flap.

Referring to the drawings in detail, the numeral 10 generally indicates an airplane wing, a broken away rear portion of which is illustrated in the various figures shown in the drawings. This portion of the wing may be provided with a fixed rear spar member schematically indicated at 12 and with other fixed elements one of which is schematically illustrated at 14. A full trailing edge flap 16 is hingedly secured to the rear edge of the fixed portion 18 of the wing 10, and is mounted to pivot about a point 20 with respect to the fixed portion of the wing. The rearward edge of the fixed wing portion 18 terminates at its upper portion in a suitable curve to receive the forward portion of the trailing edge flap and a guide vane secured thereto. The flap 16 has its forward edge as indicated at 24 lying within the arc of the curved portion of the rear edge of the fixed wing portion, the flap being formed with any selected airfoil contour. The flap is so located with respect to the fixed portion of the wing that an aperture or slot, tapering in width from the bottom to the top, and directed generally rearwardly, is provided between the rear edge of the fixed wing portion and the forward edge of the flap.

An air deflector or guide plate 26, which may be of airfoil section, is secured to the upper forward portion of the flap 16 by suitable means, such as the supports 28, and is so located with respect to the flap that its upper surface underlies and is spaced from the curved portion of the rear surface of the fixed wing portion, the arrangement also providing between the undersurface of the guide vane and adjacent surface of the flap, a space of selected aerodynamic characteristics preferably tapering from the forward toward the rear edge of the guide vane.

The flap is operated by suitable manually actuatable means, such as the expansible chamber hydraulic device, generally indicated at 30. This device comprises a cylinder 32 pivotally secured at one end to the fixed rear spar 12 and provided internally with a reciprocable piston to which is connected a rod 34, the free end of which is pivotally connected to the support 28, as indicated at 36. From this description it will be seen that reciprocation of the piston in the cylinder 32 will move the flap 16 between its neutral position as illustrated in Fig. 1 and its positions of lift increasing deflection, one of which is illustrated in Fig. 2.

Figure 1:
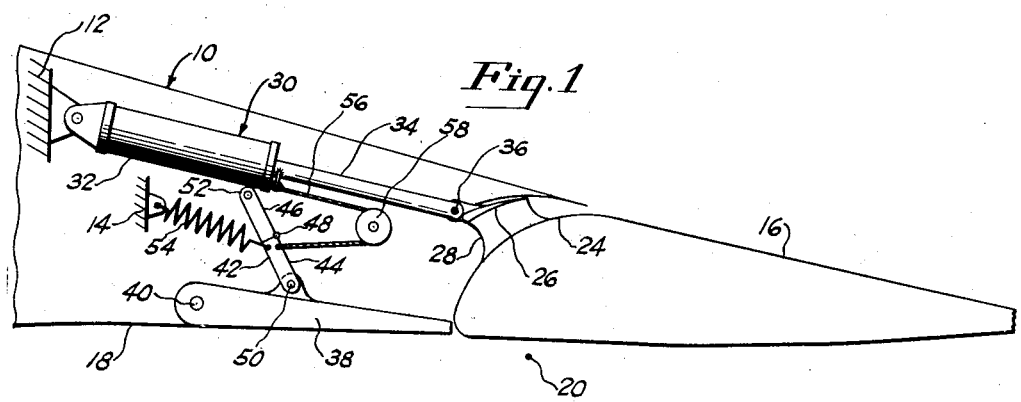
Figure 2:
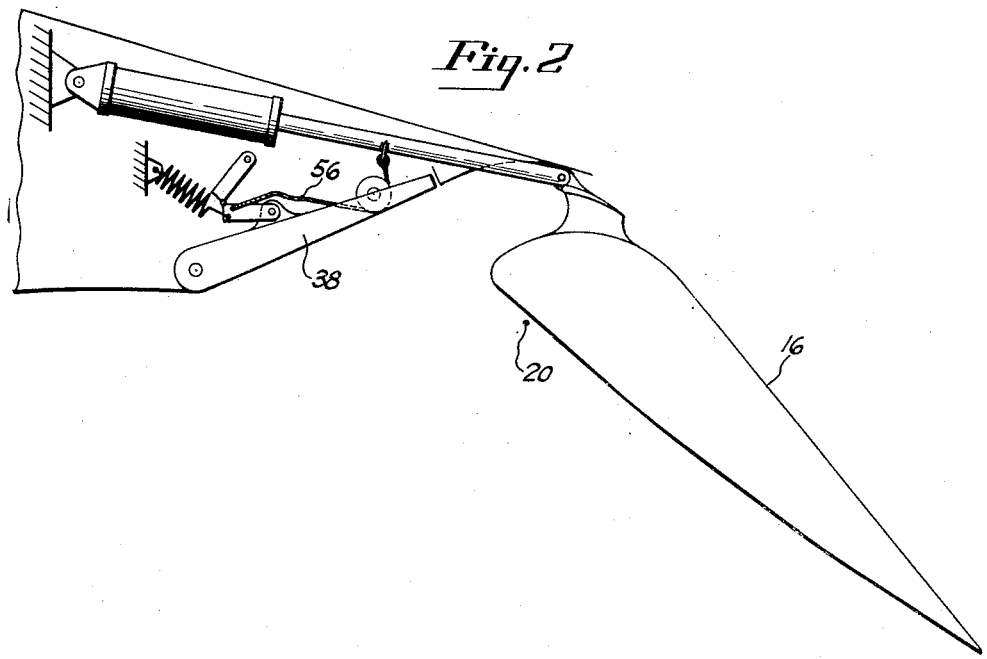
Fig. 2 is a view similar to Fig. 1 showing the trailing edge flap in a lift increasing position.

A door 38 is pivotally connected at its forward edge adjacent to the lower rearward portion of the fixed wing portion 18 as indicated at 40, and is movable between two operative positions, one of which is illustrated in Fig. 1, in which the flap 38 extends across and closes the bottom of the slot between the flap 16 and the fixed wing portion 18, and in the other of which, as illustrated in Fig. 2, the door 38 lies along the rear structure of the fixed wing portion and completely opens the slot between the fixed wing portion and the flap 16.

The slot is closed by the slot closure door 38 when the trailing edge flap 16 is in its neutral or normal flying position, as illustrated in Fig. 1, in order to avoid any increase in the drag coefficient of the wing occasioned by air flowing or leaking through the slot. However, in order for the trailing edge flap to be completely effective, it is desirable that the slot should be opened as soon as the trailing edge flap is brought to a position to materially increase the lift effect of the wing, and should remain open during further downward inclination of the flap past the point at which the lift increasing effect first becomes material. Various features must be considered in determining the most desirable point in the movement of the trailing edge flap at which the slot closure door is moved to completely open the slot between the trailing edge flap and the fixed wing portion, and this point will vary somewhat with the factors involved. As an illustrative example, it has been found desirable in at least one installation to have the slot fully open when the trailing edge flap has been tilted to an angle of approximately 12° below its normal flight, or neutral position, as illustrated in Figs. 1, 3, and 5. This means that the entire movement of the slot closure door 38 must be accomplished within the first 12° of the upper portion of the range of movement of the trailing edge flap 16, and that thereafter the slot closure door 38 will be maintained in position to fully open the slot during the remainder of the range of movement of the trailing edge flap. Three suitable mechanisms for accomplishing this result are illustrated, one in Figs. 1 and 2, another in Figs. 3 and 4, and still another in Figs. 5, 6, and 7.

In the form of the device illustrated in Figs. 1 and 2, a toggle linkage 42 comprising the elements 44 and 46 connected togethed by the elbow joint 48, is pivotally connected at its other end to a fixed portion of the wing as indicated at 52. A coiled tension spring 54 is connected at one end to the wing portion 14 and at its other end to the toggle linkage 42 adjacent to the elbow joint 48, the hinge of the elbow joint being disposed upon the opposite side of the linkage from the spring so that the tension of the spring tends to break the toggle joint and move the door 38 to its uppermost or slot opening position as illustrated in Fig. 2. A cable 56 is connected at one end to the rod 34, is led over a pulley 58, and connected at its other end to the toggle linkage 42 adjacent to the connection of the spring 54 in such a manner that tension on the cable 56 opposes the tension of the spring 54 and maintains the toggle linkage in its straight condition illustrated in Fig. 1.

The operation of this mechanism is as follows: With the trailing edge flap 16 in its neutral position as illustrated in Fig. 1, considering that the flap is being inclined to increase the lift of the wing, during the first part of the movement of the flap the tension on the cable 56 is relieved by a movement of the rod 34 so that the spring breaks the toggle joint and moves the door 38 to the position illustrated in Fig. 2, the size and relation of the parts being so arranged that this movement occurs within the upper portion, for instance, within the first 12° of movement of the trailing edge flap. Upon further movement of the trailing edge flap, the cable 56 is slacked, but no further movement of the toggle linkage takes place as the door 38 has already been moved to its uppermost position. As the trailing edge flap 16 is returned to its neutral position, the movement of the rod 34 first takes up the slack of the cable 56 and then picks up the toggle linkage against the tension of the spring 54 so that when the trailing edge flap 16 has been returned to its neutral position, the slot closure door 38 is returned to its slot closing position, illustrated in Fig. 1.

In the form of mechanism illustrated in Figs. 3 and 4, a gear segment 58 is pivotally supported upon the fixed wing portion by means of the pivot 60 and is operatively connected to the rod 34 and link 61 by means of a stud 62 so that the gear segment is rotated upon movement of the rod 34 to change the angle of the trailing edge flap 16. The gear segment 58 meshes with a gear 64, also pivotally mounted upon the fixed wing portion by means of the pin 66, and rigidly connected with a mutilated gear 68. The mutilated gear 68 has a series of gear teeth which mesh with the teeth of a second mutilated gear 70 pivotally supported upon the fixed wing portion by means of the pin 72 and connected to the slot closure door 38 by suitable means, such as the pivoted link 74.

The operation of this mechanism is as follows: During the part of the movement of the rod 34 incident to the selected upper portion of the range of movement of the flap 16, the connection 62 between the rod and the gear segment 58 causes the gear segment to rotate and in turn to rotate the gear 64 with which it meshes. Rotation of the gear 64 is transferred to the mutilated gear 68 which in turn rotates the mutilated gear 70 through a range of movement which, in the present illustrated example, has been indicated as approximately 180° so that the end of the link 74 pivoted to the gear 70 is brought from a position below the pin 72 to a substantially diametrically opposite position above the pin. This movement of the link 74 serves to move the slot closure door 38 from its slot closing position, illustrated in Fig. 3, to the position illustrated in Fig. 4, in which the slot is fully open. After the mutilated gear 70 has been rotated through this approximately 180°, the teeth on the mutilated gear 68 pass out of mesh with the teeth on the mutilated gear 70 and further rotation of the gear 68 is taken up by a sliding movement of the smooth surface 76 of the gear 68 upon a corresponding smooth surface 78 provided on the mutilated gear 70.

In the form of the invention illustrated in Figs. 5, 6, and 7, a segmental cam member, generally indicated at 80, is pivotally secured to the fixed wing portion by the pivot pin 82. This cam member is provided with an arm 84 extending outwardly from the pivotal center and operatively connected with the rod 34 and link 61 by suitable means such as the pin 86 which also secures the rod and link together so that the cam lever arm 80 will be rotated upon a movement of the rod 34, to move the flap 16 between its various operating positions. On the opposite side of the pivotal center from the arm 82, the cam member is provided with a segmental portion in which is formed a cam groove 88. From an inspection of Fig. 5, it will be observed that the main portion of this cam groove is formed as an arc with the pivotal center 82 as the center of the arc. One end of the cam groove, however, is turned downwardly away from the pivotal center as indicated at 90. A toggle linkage, generally indicated at 92, comprising the link members 94 and 96, is pivotally secured at one end to the slot closure door 38, as indicated at 98, and is pivotally secured at its opposite end to the fixed wing portion, as indicated at 100. The pin 102 connecting the adjoining ends of the links 94 and 96 is provided with a portion which rides in the cam groove 88.

The operation of this construction is as follows: Upon movement of the rod 34 in the upper portion of the range of movement of the trailing edge flap 16, the cam member 80 is rotated sufficiently to move the pin 102 out of the downwardly turned end 90 of the cam slot and into the arcuate portion thereof. The movement of the pin 102 out of the downwardly turned end of the cam slot serves to break the toggle linkage 92, as illustrated in Fig. 6, and move the slot closure door 38 from its slot closing position, illustrated in Fig. 5, to the position, illustrated in Figs. 6 and 7, in which the slot is fully open. After the linkage has been broken and the flap 38 moved to its slot opening position, during any further rotation of the cam member 80 incident to movement of the rod 34, in the lower portion of the range of movement of the trailing edge flap 16, the pin 102 simply rides in the arcuate portion of the cam groove and effects no additional change in the position of the door 38. When the flap is in its position of maximum inclination, as illustrated in Fig. 7, the pin 102 will be near the end of the arcuate portion of the cam groove as is clearly illustrated in Fig. 7. On the return movement of the trailing edge flap from its position of maximum deflection to its neutral or normal flying position, the pin 102 will ride in the arcuate portion of the cam groove during the lower portion of the range of movement of the flap and will not change the position of the slot closure door 38 until the end of the cam slot contacts the pin and forces the pin into the downwardly extending end 90 of the cam groove which occurs near the upper or neutral position of the trailing edge flap.

From the above description it will be observed that each one of the various slot closure door operating mechanisms illustrated is effective to open or close the slot during a small part of the upper portion of the range of movement of the trailing edge flap 16 so that, whenever the trailing edge flap is moved to a position to materially increase the lift effect of the wing, the slot closure door will be automatically opened to allow air to flow through the slot and over the upper surface of the trailing edge flap to maintain the lift effect of the trailing edge flap at all positions within its effective range of movement.

The guide vane 26 is arranged to curve and continue the slot as the inclination of the flap increases so that the air flowing through the slot will be at all times directed along the upper surface of the flap and, as pointed out above, the space between the guide vane and the flap is arranged to provide selected aerodynamic characteristics whereby the velocity of the air issuing from the space between the rear edge of the guide vane and the adjacent surface of the flap will be greatly increased with respect to the velocity of the air entering the bottom of the slot.

The guide vane 26 which may be of airfoil section, is so located with respect to the rear edge of the fixed wing portion 18 that air at high velocity will flow along both the upper and lower surfaces of the guide vane, so that the guide vane becomes, in its own right, a highly energized airfoil surface adding a material effect to the lift increasing characteristics of the lift increasing device.

While there has been illustrated and described a particular mechanical embodiment in three somewhat modified forms, of what is now considered to be the preferred form of the invention, it is to be understood that the invention is not limited to the particular embodiments so illustrated and described, but that such changes in the size, shape, and arrangement of parts may be resorted to as come within the scope of the appended claims.

Having now described the invention so that others skilled in the art may clearly understand the same, what is claimed and what it is desired to secure by Letters Patent is as follows:

1. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, and means for tilting said trailing edge flap to vary the lift of the wing, and means to move said door to fully open said slot during the first part of the movement of said trailing edge flap from its neutral position.

2. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, power actuated means for tilting said trailing edge flap to vary the lift of the wing, and means operated by said power actuated means to move said door to open said slot during the first part only of the movement of said trailing edge flap from its neutral position, said last mentioned means including, a lost motion connection between said power actuated means and said slot closure door.

3. In a wing lift increasing device, in combination with a trailing edge flap mounted to provide an upwardly tapering air direction slot between said flap and the fixed portion of the wing, a door pivotally secured to the fixed wing portion to extend across the bottom of said slot to control the opening thereof, power actuated means for tilting said trailing edge flap to vary the lift of the wing, and means operated by said power actuated means to move said door to open said slot during the first part only of the movement of said trailing edge flap from its neutral position, said second mentioned means comprising a toggle linkage between said slot closure door and the fixed wing portion, and means operatively associated with said power actuated means for operating said toggle linkage to open said slot during the first part of the movement of said trailing edge flap from its neutral position.

4. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, means for tilting said trailing edge flap to vary the lift of the wing, and means to move said door to open said slot during the first part only of the movement of said trailing edge flap from its neutral position, said second mentioned means comprising, a toggle linkage between said slot closure door and the fixed wing portion, a spring for breaking the toggle joint to open the slot, and a cable operatively connected with said means to control the action of said spring.

5. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, power actuated means for tilting said trailing edge flap to vary the lift of the wing, and means operated by said power actuated means to move said door to open said slot its full extent during the first part of the movement of said trailing edge flap from its neutral position, said second mentioned means comprising a gear rotatable upon movement of said trailing edge flap by said power actuated means and means connecting said slot closure door with said gear to open said slot upon rotation of said gear during the first part of the movement of said trailing edge flap from its neutral position.

6. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, a manually controllable mechanism for tilting said trailing edge flap to vary the lift of the wing, and means operated by said mechanism to move said door to open said slot during the first part of the movement of said trailing edge flap from its neutral position, said means comprising intermeshing mutilated gears one of which is rotated upon movement of said trailing edge flap by said mechanism and another of which is operatively connected with said slot closure door and rotated by said one gear during the first half only of the movement of said trailing edge flap from its neutral position.

7. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, a manually controllable mechanism for tilting said trailing edge flap to vary the lift of the wing, and means operated by said mechanism to move said door to open said slot during the first part only of the movement of said trailing edge flap from its neutral position, said means comprising a cam operated by said mechanism in moving said trailing edge flap and an operative connection between said cam and said slot closure door.

8. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, a manually controllable mechanism for tilting said trailing edge flap to vary the lift of the wing, and means operated by said mechanism to move said door to open said slot during the first part of the movement of said trailing edge flap from its neutral position, said means comprising a cam operated by said mechanism in moving said trailing edge flap, and an operative connection between said cam and said slot closure door, said cam being designed to impart movement to said slot closure door only during the first part of the movement of said trailing edge flap from its neutral position.

9. An aircraft construction including an airfoil, an auxiliary airfoil carried by and positioned in spaced relation with the said airfoil and providing a slot therebetween, means for closing the said slot between said airfoil and said auxiliary airfoil, and means for moving the said auxiliary airfoil relative to the said airfoil while maintaining the slotted relation therebetween, the said means including a differential mechanism operative on said slot closing means for substantially completely opening said slot during the first few degrees of movement of the said auxiliary airfoil from aligned position with the said airfoil, and substantially completely closing the said slot during the last few degrees of movement of the said auxiliary airfoil into aligned position with said airfoil.

10. An aircraft construction in accordance with the preceding claim, wherein said differential mechanism includes a lost motion means.

11. An aircraft construction including an airfoil, an auxiliary airfoil carried by and positioned in spaced relation with the said airfoil and providing a slot therebetween, means for closing the said slot between said airfoil and said auxiliary airfoil, and means for moving the said auxiliary airfoil relative to the said airfoil while maintaining the slotted relation therebetween, the said last mentioned means interconnected with a coacting mechanism operative on said slot closing means for substantially completely opening said slot during the first few degrees of movement of the said auxiliary airfoil from aligned position with the said airfoil, and substantially completely closing the said slot during the last few degrees of movement of the said auxiliary airfoil into aligned position with said airfoil.

12. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, movable means for tilting said trailing edge flap to vary the lift of the wing, and means operated by said movable means to move said door to open said slot during the first part only of the movement of said trailing edge flap from its neutral position and to move said door back to close said slot during the last part of the movement of said trailing edge flap back to its neutral position, said second mentioned means comprising a toggle linkage between said slot closure flap and the fixed wing portion, and means operatively associated with said movable means for operating said toggle linkage to open said slot during the first part of the movement of said trailing edge flap from its neutral position and to close said slot during the last part of the movement of said trailing edge flap back to its neutral position.

13. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, movable means for tilting said trailing edge flap to vary the lift of the wing, and means operated by said movable means to move said door to open said slot its full extent during the first part of the movement of said trailing edge flap from its neutral position and to move said door back to close said slot during the last part of the movement of said trailing edge flap back to its neutral position, said second mentioned means comprising a gear rotatable upon movement of said trailing edge flap by said movable means, and means connecting said slot closure door with said gear to open said slot upon rotation of said gear during the first part of the movement of said trailing edge flap from its neutral position and to close said slot during the last part of the movement of said trailing edge flap back to its neutral position.

14. In a wing lift increasing device, in combination with a trailing edge flap mounted to provide an upwardly tapering air directing slot between said flap and the fixed portion of the wing, a door pivotally secured to the fixed wing portion to extend across the bottom of said slot to control the opening thereof, a manually controllable mechanism for tilting said trailing edge flap to vary the lift of the wing, and means operated by said mechanism to move said door to open said slot during the first part only of the movement of said trailing edge flap from its neutral position and to move said door back to close said slot during the last part of the movement of said trailing edge flap back to its neutral position, said means comprising a cam operated by said mechanism in moving said trailing edge flap and an operative connection between said cam and said slot closure door.

15. An aircraft construction including a first airfoil, a second airfoil carried by and positioned in spaced relation with respect to said first airfoil and providing a slot therebetween and having a neutral position with respect to said first airfoil, means for closing the said slot between said first airfoil and said second airfoil, and means for moving said second airfoil relative to said first airfoil while maintaining the slotted relation therebetween, the said moving means including mechanism operative on said slot closing means for substantially completely opening said slot during the first part of the movement of said second airfoil from said neutral position and for holding said slot closing means in slot opening position during the remainder of the movement of said second airfoil from said neutral position.

ROGER W. GRISWOLD, II.